United States Patent [19]

Whiteside et al.

[11] 4,129,368
[45] Dec. 12, 1978

[54] LAST FLASH INHIBIT FOR MAGNET ACTUATED SCANNING SHUTTER BLADE ARRANGEMENT

[75] Inventors: George D. Whiteside, Lexington; Bruce K. Johnson, Andover, both of Mass.

[73] Assignee: Polaroid Corporation, Cambridge, Mass.

[21] Appl. No.: 830,024

[22] Filed: Sep. 2, 1977

[51] Int. Cl.² ............................................. G03B 15/04
[52] U.S. Cl. ...................................... 354/128; 354/139
[58] Field of Search ............... 354/127, 128, 139, 149, 354/267, 269, 234, 235

[56] References Cited

U.S. PATENT DOCUMENTS

| | | | |
|---|---|---|---|
| 3,374,718 | 3/1968 | Hochreiter | 354/35 |
| 3,391,621 | 7/1968 | Merwin | 354/128 |
| 3,429,244 | 2/1969 | Von Wasielewsky | 354/51 |
| 3,618,492 | 11/1971 | Ellin | 354/127 |
| 3,961,345 | 6/1976 | Arisaka | 354/234 |
| 4,005,449 | 1/1977 | Ellin | 354/128 |

Primary Examiner—Michael L. Gellner
Attorney, Agent, or Firm—Edward S. Roman

[57] ABSTRACT

A camera control and exposure system for cameras of the self-developing type includes "scanning type" shutter blade elements which can be quickly closed to terminate an exposure interval by a magnet actuated closing spring arrangement which is thereafter automatically recocked by way of a motor driven film advance and processing mechanism. The control and exposure system is additionally adapted for use with an array of flashlamps wherein prior to each flash photographic cycle, the array of flashlamps is sensed to determine the operative condition of the last flashlamp to be fired in the array. The system then mechanically inhibits the implementation of the photographic cycle in the event that the last flashlamp to be fired in the array is defective.

5 Claims, 15 Drawing Figures

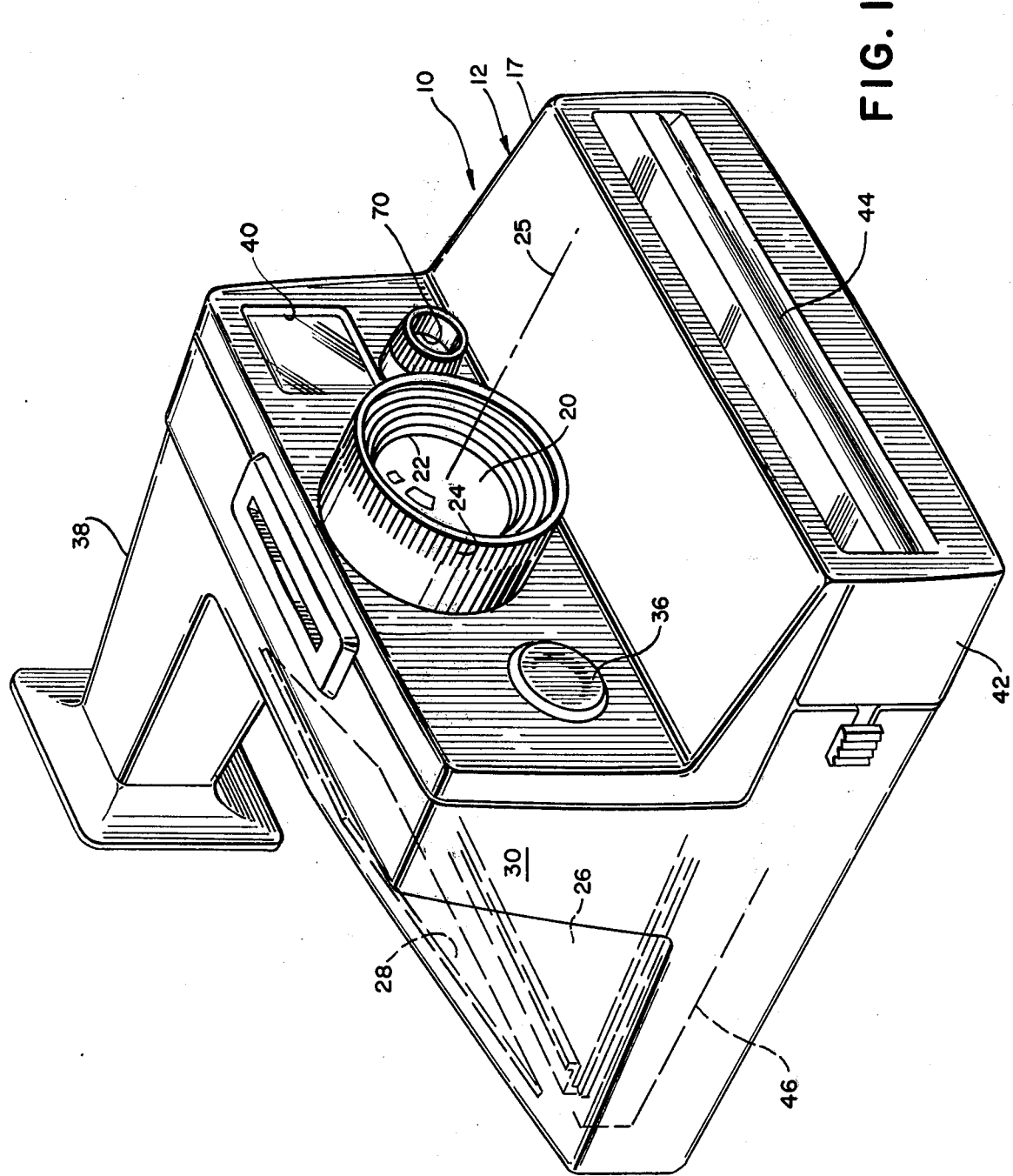

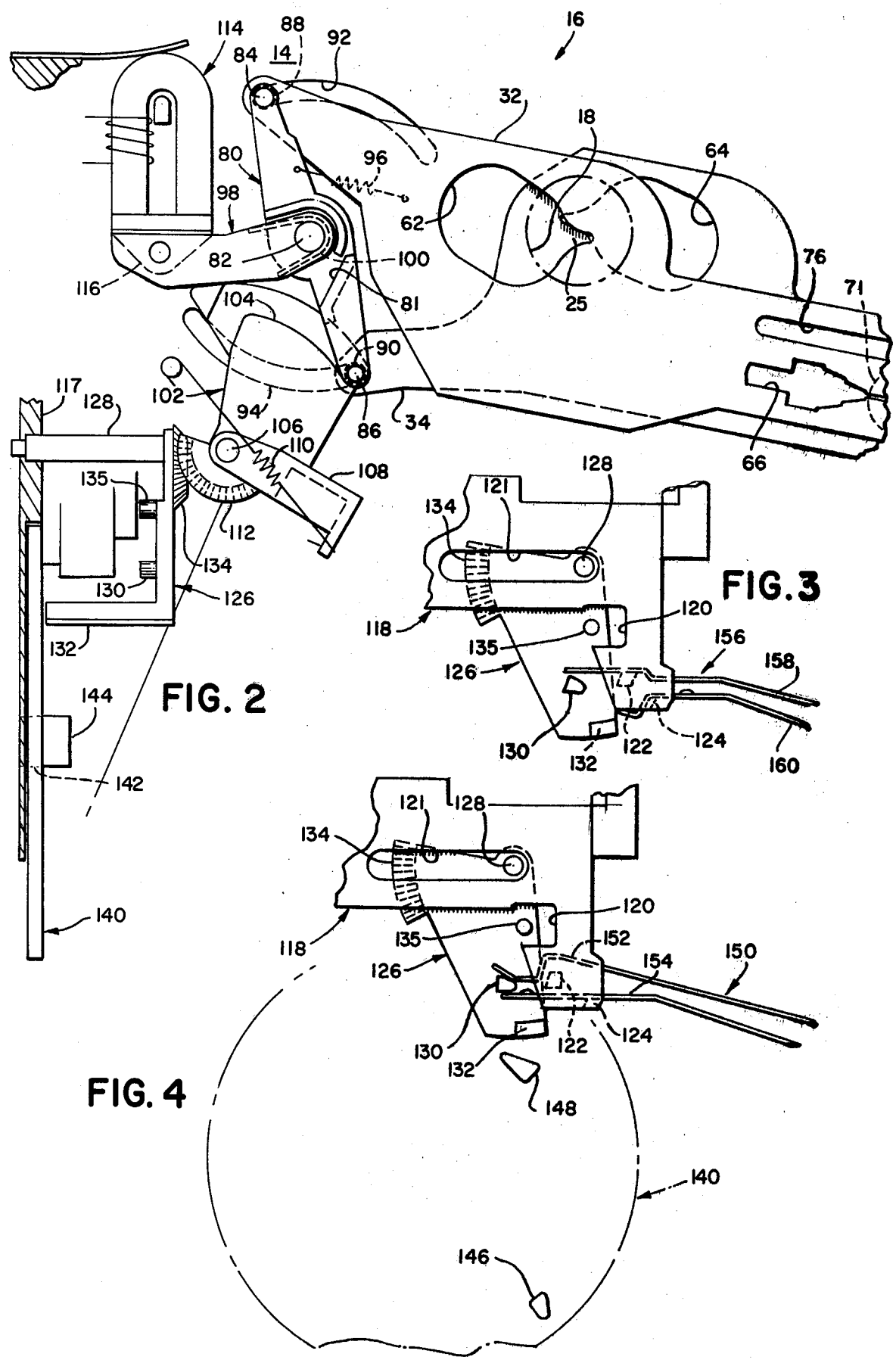

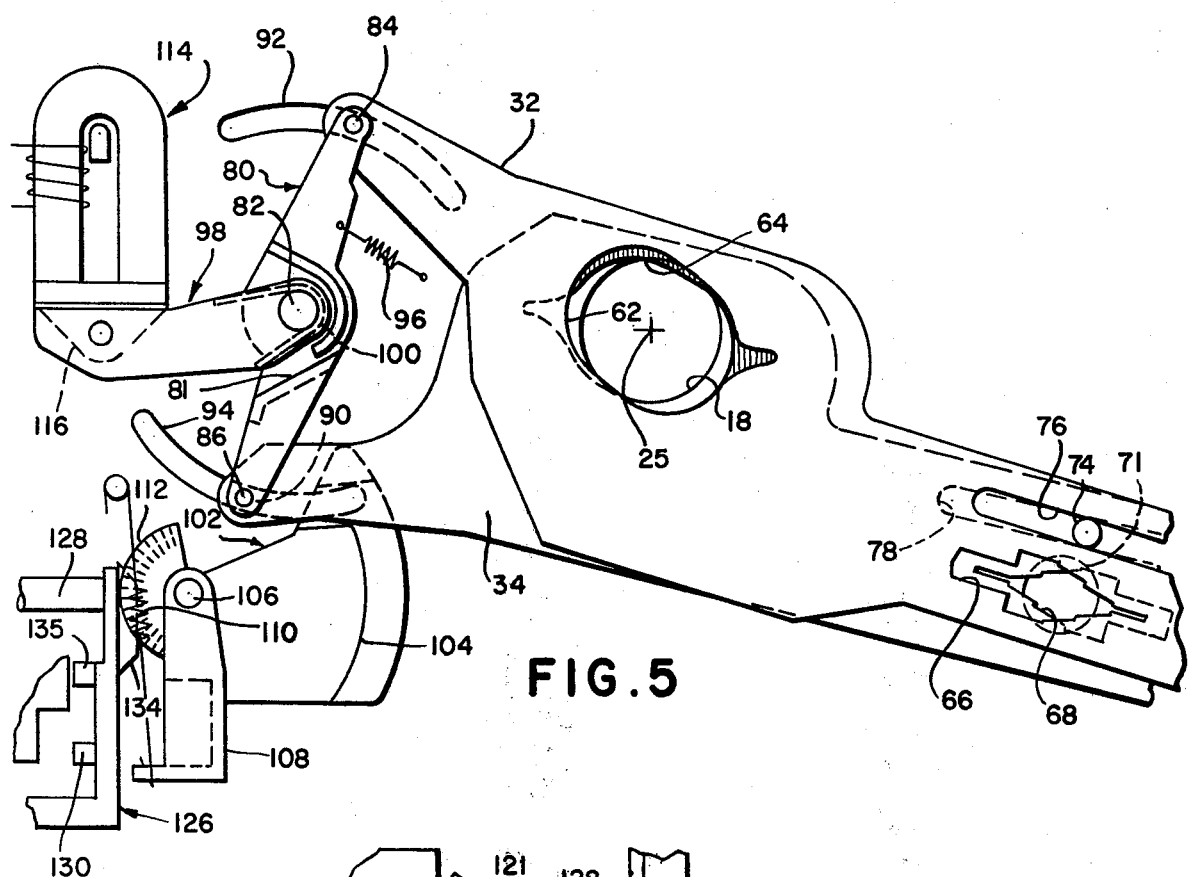
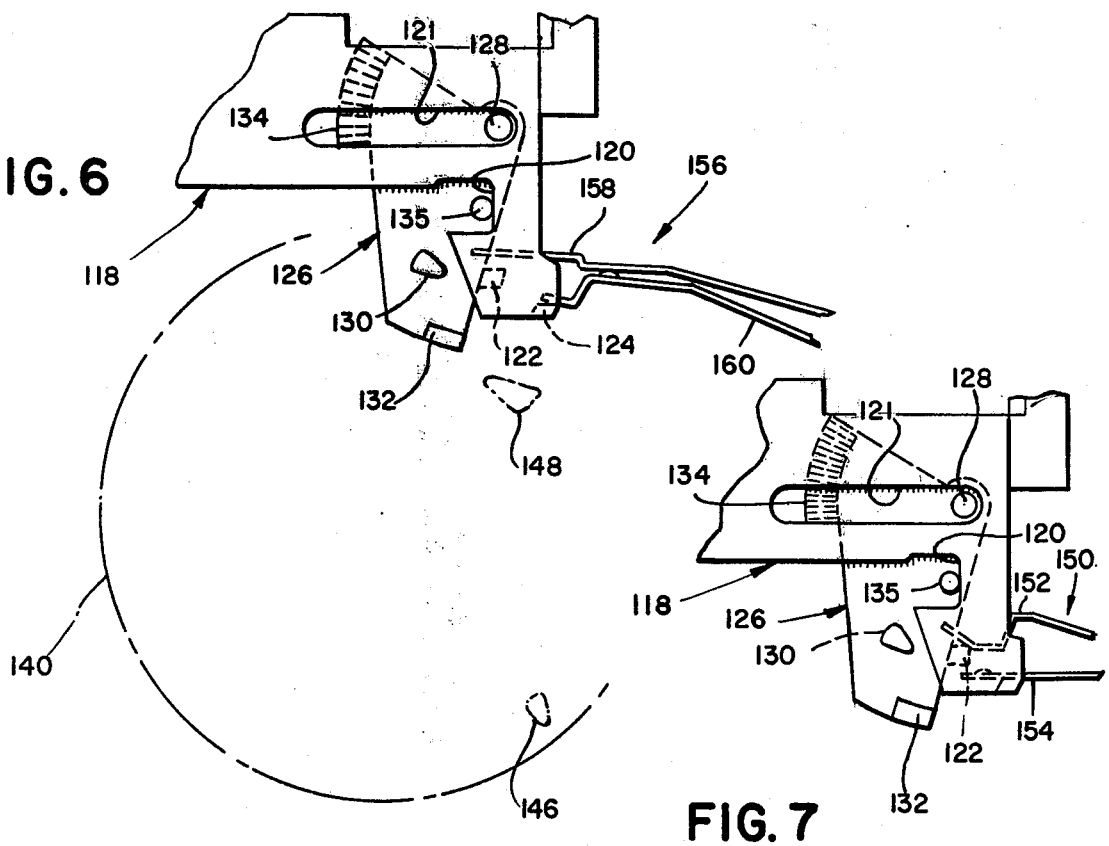

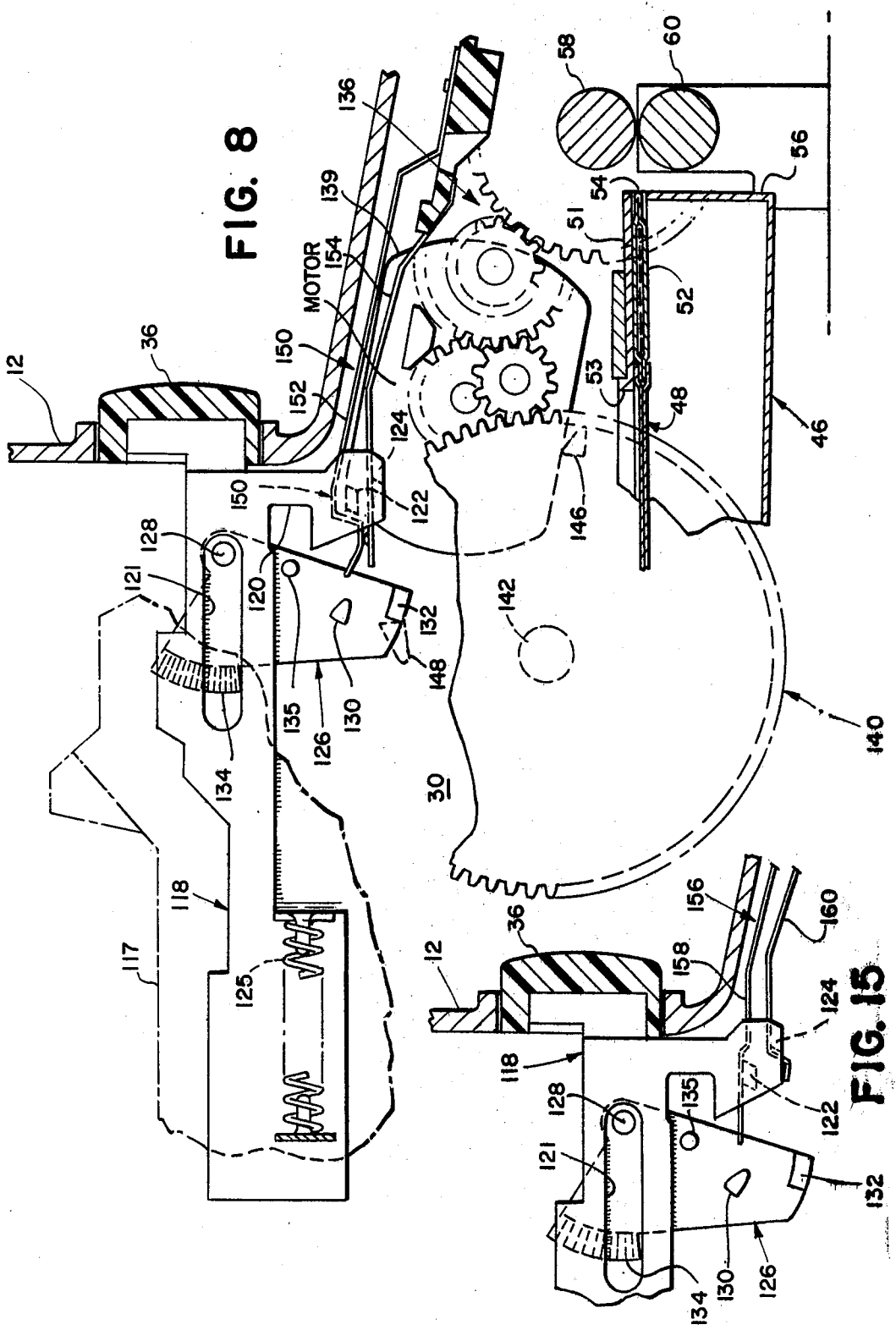

LAST FLASH INHIBIT FOR MAGNET ACTUATED SCANNING SHUTTER BLADE ARRANGEMENT

BACKGROUND OF THE INVENTION

1. Field of the Invention

This invention relates generally to an automatic camera exposure and control system and, more particularly, to an automatic camera exposure and control system for use with cameras of the self-processing type which also utilize magnet actuated "scanning type" shutter blade elements in conjunction with a last flash sensing and inhibiting feature.

2. Description of the Prior Art

Thin and compact photographic cameras of the reflex type have been developed wherein the exposure of the film unit is electronically controlled and the film unit may be rapidly processed at a processing station within the photographic camera. A version of such a camera having a compactness and thinness suited to permit convenient carrying in the pocket of a garment is described in U.S. Pat. No. 3,672,281, entitled "Reflex Camera" by E. H. Land. Such cameras are of the single lens reflex variety and require a complex exposure control system in order to accommodate a requisite viewing and focusing mode during which time the single lens reflex camera is in a normally open status to unblock the passage of light through the exposure opening to a viewfinder. An exposure control system ideally suited for such a camera is described in U.S. Pat. No. 3,641,889, issued by V. K. Eloranta. This exposure system is characterized by the use of a tractive electromagnetic device, preferably a solenoid, for contolling the movement of a pair of "scanning type" shutter blade elements. Use of a solenoid driven "scanning type" shutter system allows for the development of dual exposure parameter regulation (aperture and speed) of the exposure value of any given exposure. For instance, following an initial energization of the solenoid, it may be de-energized to permit the blades of the exposure mechanism to progressively open under a spring bias to define a gradually enlarging aperture. The exposure interval may then be terminated by again energizing the solenoid to rapidly drive the exposure mechanism blades to a closed orientation. Controlled initial de-energization of the solenoid for purposes of commencing exposure interval, as well as subsequent energization of the solenoid to terminate an exposure interval, is carried out by an electronic control circuit which operates in conjunction with a light sensing network arranged to be responsive to light levels of the scene being photographed. Such solenoid actuated "scanning type" shutter blade arrangements have also been utilized in non-reflex cameras such as Polaroid Corporation's newly marketed Pronto type cameras.

The use of a solenoid to drive a "scanning type" shutter blade arrangement is limited, however, in the speed at which the shutter blade elements can be driven from their scene light blocking position. Solenoids include an internally disposed plunger or armature which is drawn within an excitation winding during the energization thereof and the acceleration of the plunger is limited by the time delay required for the solenoid to develop a maximum magnetic flux condition to arrest the outward movement of the plunger from the excitation winding. Solenoid actuated shutter blades may also encounter pull and time variations due to power variations in the camera power supply.

One attempt at solving the problems encountered as a result of voltage level variations in a camera battery supply which might affect the solenoid pull in time is disclosed in U.S. Pat. No. 3,922,698 entitled "Dynamically Compensated Exposure Control System" by C. Peterson, issued Nov. 25, 1975. Peterson discloses an exposure control system wherein the actuating drive or solenoid of the system is coupled to be operated only against a substantially constant force of a spring bias, while the exposure mechanism movement with its attendant mass acceleration characteristics is provided by a spring drive isolated from the spring bias against which the solenoid is driven. Thus, by isolating the solenoid from the spring drive serving to close the shutter, there may be provided a constant rate of shutter blade closing despite variations in the power supply to the camera. However, the shutter blade closing speed is still limited by the time required to pull in the solenoid plunger as is the case where the solenoid operates directly on the shutter blade mechanism to drive the shutter blades to their scene light blocking position.

Shutter blade arrangements embodying two electromagnets as disclosed in U.S. Pat. No. 3,593,630 entitled "Breaking and Sequencing Mechanism" by L. Douglas et al., issued July 20, 1971, can provide quicker shutter blade closing times than are possible with the aforementioned solenoid actuated "scanning type" shutter arrangement. The Douglas shutter arrangement, however, is not of the "scanning type" and thus does not provide the advantages pertinent to a "scanning type" shutter blade arrangement, i.e., greater depth of field resulting from a slow progressive opening of the aperture. The aperture of Douglas is defined instead by a diaphragm element separate and distinct from the shutter closing assembly which is controlled by the electromagnets.

One solution to the aforementioned difficulties is taught in a copending application for U.S. patent Ser. No. 830,111 entitled "Electromagnet Controlled Scanning Shutter Blade Arrangement," by D. Pizzuti filed in common assignment herewith wherein an exposure control system is provided with an electromagnet for controlling the closing of a "scanning type" shutter blade arrangement. Substantial advantages both in cost and performance may be provided by this arrangement which constitutes prior art with respect to the claims of this invention.

An improved arrangement to that of Pizzuti is taught in a copending application for U.S. patent Ser. No. 830,019 entitled "Exposure Control System", by George Whiteside filed in common assignment herewith and also constitutes prior art with respect to the claims of this invention. Neither of the aforementioned applications disclose an exposure control system for use with a source of artificial illumination and the problems associated therewith.

Therefore it is a primary object of this invention to provide a camera exposure and control system of the aforementioned type for use with a plurality of flash lamps and which automatically provides a signal indicative of the expenditure of all the flash lamps such that the camera control system, in response to the expenditure of all the flash lamps, mechanically inhibits the actuation of an exposure cycle.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A photographic camera apparatus of the type having means for mounting photographic film material at a given focal plane, means for releasably connecting to at least one conventional flash lamp and means for providing a signal to fire the connected flash lamp at the appropriate time during an exposure cycle, also includes a blade mechanism and means for mounting the mechanism for displacement between at least one blocking arrangement precluding transmission of scene light to the focal plane and an unblocking arrangement defining at least one aperture value structured for transmission of scene light to the focal plane. Resilient means are provided for yieldably urging the mechanism from its blocking arrangement toward its unblocking arrangement. Selectively actuable means movable between first and second positions are also included for retaining the blade mechanism in its blocking arrangement against the urging of the resilient means while in its first position. The selectively actuable means moves from its first position to its second position in response to selective actuation so as to release the blade mechanism for movement from its blocking arrangement to its unblocking arrangement under the influence of the resilient means. Means at least in part electrically energizable are provided for sensing the operative condition of at least one connected flash lamp at the connecting means and responding to an inoperative or missing lamp by restraining the selectively actuable means from moving from its first position to its second position regardless of any attempt by the user to actuate the selectively actuable means.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment or when read in connection with the accompanying drawings wherein like numbers have been employed in different figures to denote the same parts and wherein:

FIG. 1 is a perspective view of a camera embodying the exposure control system of this invention;

FIG. 2 is a front elevation with portions broken away of the exposure control system of this invention;

FIG. 3 is a side elevation of a portion of the exposure control system of this invention;

FIG. 4 is a side elevation showing other portions of the exposure control system of this invention including some portions of FIG. 3;

FIG. 5 is a front elevation with portions broken away of the exposure control system of this invention including portions of FIG. 2 in a different mode of its operation;

FIG. 6 is a side elevation of the portion of the exposure control system of FIG. 3 in another mode of its operation;

FIG. 7 is a side elevation of a portion of the exposure control system of FIG. 4 in another mode of its operation;

FIG. 8 is a side elevation with portions broken away of the exposure control system of this invention including the portions of FIG. 4 in still another mode of its operation;

FIG. 15 is a side elevation of the portion of the exposure control system of FIG. 3 in still another mode of its operation.

DESCRIPTION OF THE PREFERRED EMBODIMENT

Figure 9:
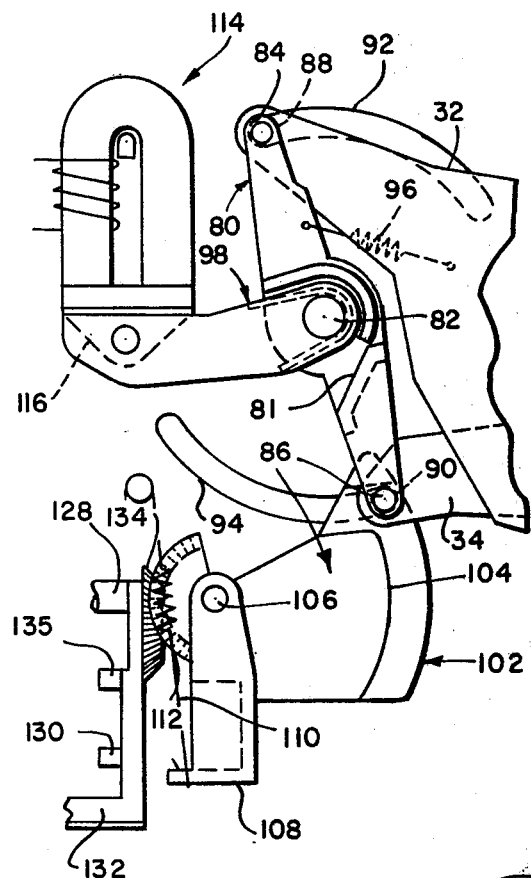
FIG. 9 is a front elevation of a portion of the exposure control system of FIG. 2 in still another mode of its operation.

Referring now to FIGS. 1 and 2 it can be seen that the exposure control system of this invention is associated with a photographic camera apparatus 10 contained within a housing shown generally at 12. A base block casting 14 is fixedly stationed within the housing 12 and is selectively machined to support the various components of an exposure mechanism shown generally at 16. In that portion of the housing 12 which surrounds the front and top of the base block casting 14, there is provided at least one opening through which extends a manually adjustable focus bezel 24. Centrally disposed within the base block casting 14, there is provided a light entering exposure opening 18 which defines the maximum available exposure aperture for the system.

An objective or taking lens 20 is provided in overlying relation to the light entering opening 18 wherein the objective lens 20 may comprise a plurality of elements retained in predetermined spaced relation by a cylindrical lens mount 22 which is externally threaded for toothed engagement with the internally threaded focus bezel 24. As is readily apparent, focus bezel 24 is made rotatable with respect to the housing 12 to provide translational movement of the elements of lens 20 along a center axis 25 of the optical path of the housing 12. As is readily apparent, the central optical axis 25 is illustrated in FIGS. 2 and 5 as being normal to the plane of the drawing. Thus, rotation of focus bezel 24 may be carried out by manual rotation to provide displacement of the elements of objective lens 20 for focusing of image-carrying rays through the light entering exposure opening 18 to a rearwardly positioned film plane 26 by way of a reflecting mirror 28 all of which are stationed within a suitable lighttight film exposure chamber 30 within the housing 12.

Intermediate the objective lens 20 and light entering exposure opening 18, there is provided a shutter blade mechanism including two overlapping shutter blade elements 32 and 34 of the so-called "scanning type" which will be subsequently described in greater detail herein. Extending from the front of housing 12, there is provided a photographic cycle initiating button 36, the depression of which commences the exposure interval by ultimately effecting the release of the shutter blade elements 32 and 34 in a manner to be subsequently described herein.

The housing 12 may include an integrally molded viewfinder portion 38 extending rearwardly from the front thereof. The viewfinder portion 38 of the housing 12 affords protection to internal components positioned therein to enable a user to aim the camera and frame a desired subject of a scene to be photographed through a window 40 included within the front of the housing 12.

A film loading access door 42 including a film withdrawal slot 44 transversely disposed therein is pivotally mounted for movement between positions blocking and unblocking an open end of the chamber 30 included within the housing 12 for receiving and supporting a film cassette or container 46 therein. The cassette 46 encloses an assemblage including a plurality of film units 48 (see FIG. 8) and a dark slide (not shown) superpositioned thereto in the usual manner for preventing exposure of a forwardmost film unit prior to insertion of the film cassette 46 into the chamber 30.

The film units 48 are multilayered structures including one or more photosensitive image-receiving layers arranged in superposed relation and a rupturable pod 52 containing a supply of fluid processing composition attached to a leading end of the film unit 48. The film cassette 46 including the assemblage is similar to that disclosed and defined in U.S. Pat. No. 3,874,875, issued to E. H. Land on Apr. 1, 1975. The film units 48 included in the assemblage represent a general class of "integral type" self-developing type film units similar to that described in U.S. Pat. No. 3,415,644 issued to E. H. Land on Dec. 10, 1968. The film cassette 46 is shown in position within the film receiving chamber 30 of the camera 10 in FIG. 8. The cassette 46 has a general tapered rectangular shape having a forward wall 51 including an exposure aperture 53 therein which is generally coextensive with the photosensitive area of the underlying film unit 48 contained within the cassette 46. Once the cassette 46 has been properly positioned within the chamber 30, the dark slide cover (not shown) is automatically removed prior to commencing a first photographic exposure cycle whereupon the forwardmost film unit 48, subsequent to exposure, is advanced through an elongated film exit slot 54 disposed transversely within a leading end wall 56 of the film cassette 46. As the forwardmost member advances through the exit slot 54, it enters into the bite of a pair of juxtaposed pressure-applying members or rollers 58 and 60 mounted adjacent the film withdrawal slot 44.

The film loading access door 42 is pivotally connected to housing 12 in such a manner so as to allow the access door 42 and the rollers 58 and 60 to be pivoted downwardly to provide access to the film receiving chamber 30 for loading and unloading a film cassette 46 in the usual manner. A detailed description of the manner in which the film loading access door and rollers 58 and 60 are coupled to the remainder of the camera may be found in U.S. Pat. No. 3,974,510 issued Aug. 10, 1976, in the name of Andrew S. Ivester, entitled "A Mounting Apparatus for a Spread Roller Assembly". The rollers 58 and 60 are suitably mounted within the access door 42 by a mounting bracket (not shown).

A pair of scene light admitting primary apertures 62 and 64 are provided respectively in the blade elements 32 and 34 to collectively define a progressive variation of effective aperture openings in accordance with simultaneous longitudinal and lateral displacement of one blade element with respect to the other blade element in a manner as is fully described in U.S. Pat. No. 3,942,183 entitled "Camera With Pivoting Blades" by George D. Whiteside, issued Mar. 2, 1976. The apertures 62 and 64 are selectively shaped so as to overlap light entering exposure opening 18 thereby defining a gradually varying effective aperture size as a function of the position of the blade elements 32 and 34.

Each of the blades 32 and 34 may additionally be configured to have corresponding photocell sweep secondary apertures shown respectively at 66 and 68. Secondary apertures 66 and 68 may be configured in correspondence with the shapes of scene light admitting primary apertures 62 and 64. As is readily apparent, the secondary apertures 66 and 68 also move in correspondence with the primary apertures 62 and 64 to define a small secondary effective aperture for admitting the passage of scene light transmitted through a photocell aperture 70 in the front of housing 12 from the scene to be photographed.

Scene light admitted by the photocell secondary apertures 66 and 68 is thereafter directed to a light detecting station shown generally at 71. The light detecting station 71 includes a photoresponsive element (not shown) which cooperates with a light integrating capacitor together with light integrating and control circuitry all of which form a part of the control circuit 72 as shown schematically in FIG. 14 and which are more fully described in U.S. Pat. No. 4,017,873, entitled "Exposure Control System with Braking Capability" by E. K. Shenk, issued Apr. 12, 1977. In this manner, the exposure interval can be terminated as a function of the amount of light received through the secondary effective aperture defined by the overlapping photocell sweep secondary apertures 66 and 68.

Projecting from the base block casting 14 at a location spaced laterally apart from the light entering exposure opening 18, is a pivot pin or stud 74 (see FIG. 5) which pivotally and translatably engages elongated slots 76 and 78 formed in respective shutter blades 32 and 34. Pin 74 may be integrally formed with the base block casting 14 and blade elements 32 and 34 may be retained in engaging relation with respect to the pin 74 by any suitable means such as peening over the outside end of the pin 74 in a well known manner.

The opposite ends of the blade elements 32 and 34 respectively include extended portions which pivotally connect to a walking beam 80. Walking beam 80, in turn, is disposed for rotation relative to the base block casting 14 by pivotal connection to a projecting pivot pin or stud 82 which may be integrally formed with the base block casting 14 at a location spaced laterally apart from the light entering exposure opening 18. The walking beam 80 may be axially retained to the pin 82 by conventional means such as E ring (not shown). In the preferred mode, the walking beam 80 is pivotally connected at its distal ends to respective shutter blade elements 32 and 34 by respective pin members 84 and 86 which extend laterally outward from the walking beam 80. Pin members 84 and 86 are preferably circular in cross-section and extend through respective circular openings 88 and 90 in respective blade elements 32 and 34 so as to slidably engage arcuate slots or tracks 92 and 94 which may be integrally formed within the base block casting 14. The arcuate tracks 92 and 94 operate to inhibit disengagement of the blade elements 32 and 34 from their respective pin members 84 and 86 during operation of the exposure control system. Thus, the shutter blade elements 32 and 34 define a blade mechanism which is mounted for displacement between at least one scene light blocking arrangement precluding transmission of scene light to the film plane 26 as shown in FIG. 2 and a scene light unblocking arrangement defining at least one aperture value structured for transmission of scene light to the film plane 26 as shown in FIG. 5. The means for mounting the blade mechanism for such displacement collectively comprise the walking beam 80 together with the pivot pins 74, 82, 84 and 86.

Means which are ultimately selectively actuable are provided for driving the shutter blade elements 32 and 34 from the scene light blocking arrangement toward the scene light unblocking arrangement and comprise a tension spring element 96 having one end connected to the walking beam 80 and the other end grounded with respect to the base block casting 14. Means are also provided for driving the shutter blade elements 32 and 34 from their scene light unblocking arrangement back to their scene light blocking arrangement and comprise an elongated hammer 98 disposed for coaxial pivoting movement with respect to the walking beam 80 about the pivot pin 82. The hammer 98 is yieldably biased for rotation in a counterclockwise direction by a torsion spring member 100. The method by which the hammer 98 drives the shutter blade elements 32 and 34 from their scene light unblocking arrangement back to their scene light blocking arrangement will be made apparent from the following discussion. As will be readily understood, the spring element 96 may alternatively be a compression spring so long as the spring is connected to continuously urge the walking beam 80 to rotate in a clockwise direction as viewed in FIGS. 2 and 5 thereby continuously urging the shutter blade elements 32 and 34 into their scene light unblocking arrangement as shown in FIG. 5.

The exposure control system additionally includes a latching disc 102 disposed for pivotal movement with respect to the base block casting 14 about a pivot pin 106. The latching disc 102 includes a cam surface 104 integrally formed thereon for engagement with the edge of the walking beam 80 in a manner to be subsequently described. The latching disc 102 additionally includes an integral lever arm portion 108 extending outwardly therefrom into connection with one end of an over center tension spring 110, the other end of which is grounded with respect to the base block casting 14. The spring 110 operates to resiliently urge the latching disc 102 to rotate about the pivot pin 106 in one of either two directions in a manner to be subsequently described. In addition, the latching disc 102 includes an integral gear segment 112 formed thereon.

Latching means are additionally provided by an electromagnet 114 for selectively latching the hammer 98 in a position as shown in FIG. 2 so as to restrain the hammer 98 from moving under the resilient urging of its biasing spring 100. Toward this end, the hammer 98 includes a magnet keeper 116 thereon which is attracted to latchingly engage the magnet 114 upon energization of the magnet 114 in the usual manner.

Referring now to FIGS. 2 and 8, there can be seen a side mounting member or wall 117 which extends generally perpendicularly backward from the plane of the base block casting 14. An actuator member 118 which connects at one end to the photographic cycle initiating button 36 is disposed for reciprocal translation along the side mounting member 117 in a direction generally perpendicular to the plane of the base block casting 14.

A compression spring 125 which is grounded at one end to the side member 117, connects at its other end to the actuator member 118 so as to bias the actuator to move forward toward the base block 14. The actuator member 118 includes an edge can surface 120 thereon together with a pair of laterally extending integrally molded projections 122 and 124. The actuator member 118 is disposed for cooperative engagement with another actuator member 126 which is pivotally connected to the side wall member 117 for rotation about an elongated shaft 128 extending laterally outward from the side thereof through an elongated slot 121 in the actuator 118. The actuator member 126 in turn also includes a pair of laterally extending, integrally molded projections 130 and 132 together with a gear segment 134 which meshes with the gear segment 112. There is also included an integrally molded pin 135 extending laterally outward from the side of the actuator member 126 for cooperative engagement by the cam surface 120 in a manner to be subsequently described.

The camera 10 is also provided with a motor driven gear train shown generally at 136 in FIG. 8. The gear train is driven by an electrically energized motor 139 which may be energized by an electrical battery 138 as shown schematically in FIG. 14 and preferably included within the film cassette 46, as disclosed in U.S. Pat. No. 3,543,662 issued to Irving Erlichman on Dec. 1, 1970, or from a separate battery source mounted within the camera.

A sequencing gear or wheel 140 is rotatably driven by the motor gear train 136. The sequencing wheel 140 includes a center bore 142 therethrough disposed for rotation about an integrally molded shaft 144 extending laterally outward from the side mounting member 117. The sequencing wheel 140 includes a pair or profile cams 146 and 148 extending outwardly from one side thereof to drive respectively a film advance mechanism (not shown) and the actuator member 126 in a manner to be subsequently described. The film advance mechanism, although not shown, includes a reciprocating film advance member or device for advancing the forwardmost film unit 48 in the film cassette 46 from the exposure position, through the film exit slot 54, and into the bite of the pressure-applying rollers 58 and 60 which are also driven by the gear train 136. A film advance mechanism suitable for use in the camera 10 is more fully described in a U.S. Pat. No. 3,967,304 entitled "Modular Constructed Sequencing System for Photographic Apparatus" by Bruce K. Johnson, et al., issued June 29, 1976.

Referring now to FIGS. 4, 7 and 8, there can be seen to be provided a motor control switch 150 which, when electrically closed, connects the motor 139 directly to the electrical battery 138. The motor control switch element 150 comprises a pair of conductive spaced apart, resilient leaf members 152 and 154 which are resiliently biased to move toward electrical contact with each other. There is additionally provided a control circuit switch 156 aside the motor control switch 150. When the control circuit switch 156 is electrically closed, it operates to connect the control circuit 72 directly to the electrical battery 138. In like manner, the control circuit switch comprises a pair of spaced apart, resilient conductive leaf members 158 and 160 biased to move toward electrical contact with each other. As is now readily apparent, the control circuit switch 156 is stationed in fixed, spaced apart, generally parallel, relation with respect to the motor control switch 150.

By referring now to FIGS. 2 through 4, it can be seen that immediately prior to the initiation of a photographic exposure cycle, the motor control switch 150 is maintained in an electrically open condition by virtue of the projection 130 from the actuator member 126 engaging the switch leaf 152 so as to restrain it from making contact with the opposing motor switch leaf 154. In like manner, the control circuit switch 156 is also maintained in an electrically open condition by virtue of the projection 122 from the actuator member 118 engaging the switch leaf 158 so as to restrain it from contacting the opposing control circuit switch leaf 160. In this manner, both the motor control switch 150 and the circuit control switch 156 are maintained in their open conditions prior to actuation of the button 36 to commence a photographic exposure cycle.

Depressing the button 36, in turn, operates to drive the actuator member 118 inwardly such that its cam surface 120 engages the pin 135 on the actuator member 126 in a manner operating to rotate the actuator member 126 in a clockwise direction about its pivot pin 128 as may be viewed in FIGS. 3 and 4. As is readily apparent, clockwise rotation of the actuator member 126 operates to rotate the projection 130 out of engagement with the motor control switch leaf 152. However, before such disengagement can be effected to close the motor switch 150, projection 122 from actuator member 118 engages switch leaf 152 so as to restrain it from moving toward the opposing switch leaf 154 and thereby closing the motor control switch 150 as shown in FIG. 7. Inward movement of projections 122 and 124 causes control circuit switch leaf 160 to move into electrical contact with the opposing switch leaf 158 thereby electrically closing the control circuit switch 156 so as to connect battery power to the control circuit 72 as shown in FIG. 6. The control circuit 72, in turn, operates to power the electromagnet 114 so as to maintain the hammer 98 in its latched position as shown in FIG. 2.

Rotation of the actuator member 126 in the aforementioned manner operates by way of the meshed gear segments, 134 and 112, to rotate the latch disc 102 about its pivot pin 106 in a clockwise direction from a first position as shown in FIG. 2 wherein the cam surface 104 engages the edge of the walking beam 80 to restrain the shutter blade elements 32 and 34 from moving from their scene light blocking arrangement under the bias of spring element 96. As is also readily apparent, the outside peripheral edge latching disc 102, when in its aforementioned first position also operates to engage the underlying edge of the hammer 98 so as to maintain the magnet keeper 116 in juxtaposition with respect to the electromagnet 114 against the yieldable bias of the hammer drive spring 100. Continued clockwise rotation of the actuator member 126 operates to drive the latching disc 102 to a second position as shown in FIG. 9 from whence the walking beam 80 becomes disengaged from the cam surface 104 thereby permitting the walking beam 80 to rotate in a clockwise direction about its pivot pin 80. The shutter blade elements 32 and 34, are thus moved in concert with the walking beam 80 under the influence of spring element 96 from their scene light blocking position of FIG. 2 to their scene light unblocking position as shown in FIG. 5 to commence an exposure cycle. A third switch element 162 as shown schematically in FIG. 14 may be actuated by the latching disc 102 moving towards its aforementioned second position so as to initiate an exposure control scene light integrating operation by way of the photocell light detecting station 71 and control circuit 72 in the usual manner. The over center spring 110 also is moved across the pivot pin 106 so as to resiliently bias the latching disc 102 toward its extreme clockwise position.

Figure 10:
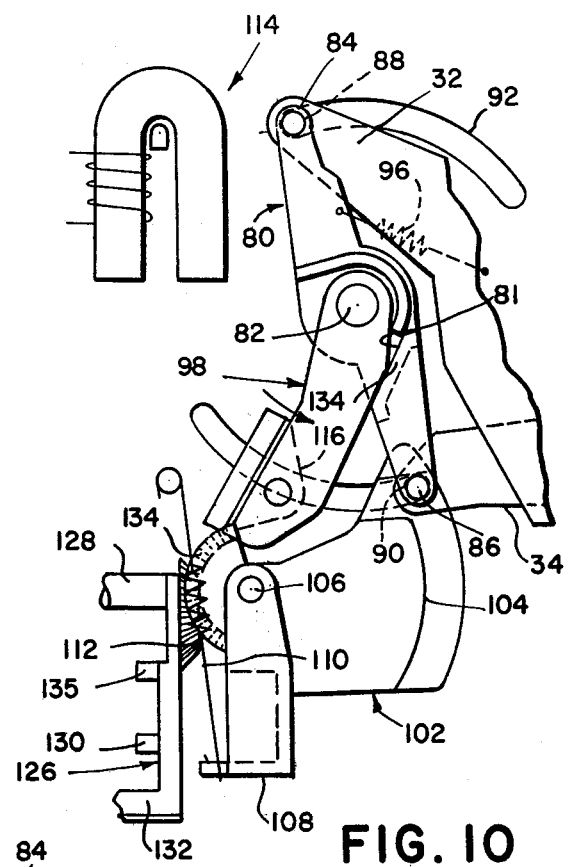
FIG. 10 is a front elevation of the portion of the exposure control system of FIG. 9 in another mode of its operation.

The control circuit 72 thereafter integrates scene light received by way of the light detecting station 71 in the usual manner until a desired exposure value has been reached at which instant the control circuit 72 provides a control signal to deenergize the magnet 114. Deenergization of the magnet 114, in turn, operates to release the magnet keeper 116 of the hammer 98 whereupon the hammer 98 is rotated in a clockwise direction, as viewed in FIG. 10, under the operative influence of its resilient biasing spring 100. Continued counterclockwise rotation of the hammer 98 operates to bring the leading edge of the hammer into engagement with a recessed edge 81 of the walking beam 80 so as to rotate the walking beam 80 in a counterclockwise direction thereby driving the shutter blade elements 32, 34 from their scene light unblocking arrangement back to their scene light blocking arrangement as seen in FIG. 10. Thus, in this manner is a photographic exposure cycle terminated at a rate that is faster than would otherwise be possible by the use of a solenoid in the usual manner. As is readily apparent, the hammer biasing spring 100 exerts a substantially stronger force than the opening drive spring element 96 so as to drive the walking beam 80 towards its scene light blocking arrangement against the biasing influence of the drive spring 96.

If the user at this time has not yet released the photographic cycle initiating button 36, the camera will perform no further automatic operations and the exposed film unit 48 will remain in the film exposure chamber 30 adjacent the film plane 26. Release of the photographic cycle initiating button 36 permits the actuator 118 to translate forwardly under the influence of its drive spring 125. As is readily apparent, such outward translation of the actuator 118 operates to disengage the cam surface 120 from the pin 135 on actuator 126 thereby leaving the actuator 126 in place. Forward movement of the projections 122 and 124 operates to engage the control circuit switch 156 as shown in FIG. 15. Projection 122 also simultaneously operates to disengage from the motor switch leaf 152 so as to permit the motor control switch 150 to close and electrically energize the motor 139 as shown in FIG. 8. As is now readily apparent, the motor control switch leaf 152 is allowed to spring toward its opposing motor control switch leaf 154 when the projection 122 translates forwardly as a result of the projection 130 of actuator 126 being rotated to its extreme clockwise position out of potential interfering engagement with the leaf 152.

Energization of the motor 139 now operates to drive the gear train 136 to rotate the sequencing wheel 140 in a clockwise direction as viewed in FIG. 8. Continued rotation of the sequencing wheel 140 in the clockwise direction operates to rotate the profile cam 146 into driving engagement with the aforementioned film advance mechanism (not shown) in a manner as is more fully described in U.S. Pat. No. 3,967,304, supra. The film advance mechanism operates to advance the exposed film unit 48 from the film cassette 46 through the film exit slot 54 and into the bite of the processing rollers 58 and 60. The processing rollers 58 and 60 thereafter operate in the usual manner to process the exposed film unit 48 while simultaneously advancing the exposed film unit through the film withdrawal slot 44.

Subsequent to film processing and advancement in the aforementioned manner, the second profile cam 148 on the sequencing wheel 140 is rotated into engagement with the projection 132 on the actuator member 126 in a manner operating to rotate the projection 132 and its associated actuator 126 in a counterclockwise direction about its pivot pin 128. Counterclockwise rotation of the actuator 126, in turn, operates to rotate projection 130 into engagement with the motor control switch leaf 152 so as to urge it out of electrical contact with its opposing control switch leaf 154 thereby opening the motor control switch 150 so as to deenergize the motor 139. The photographic cycle is thus automatically terminated in this manner.

Figure 11:
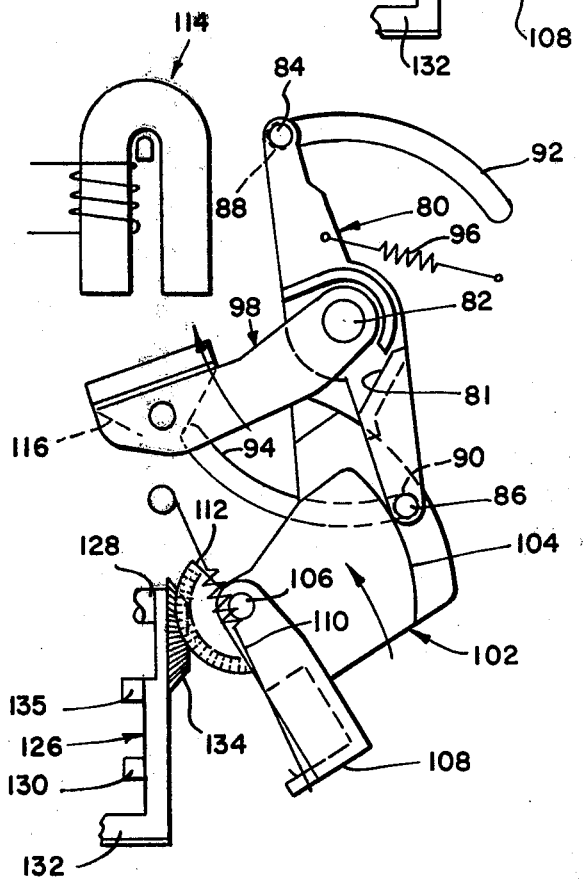
FIG. 11 is a front elevation of the portion of the exposure control system of FIG. 9 is still another mode of its operation.

Referring now to FIG. 8 in conjunction with FIG. 11 it can be seen that counterclockwise rotation of the actuator 126 operates, in turn, to recock the latching disc 102. Thus, counterclockwise rotation of the actuator 126 operates to impart a counterclockwise rotation to the latching disc 102 by way of the intermeshed gear segments 134 and 112. Counterclockwise rotation of the latching disc 102, in turn, operates to move the cam surface 104 into engagement with the edge of the walking beam 80 thereby restraining the walking beam 80 from being urged by the drive spring 96 to rotate toward its scene light unblocking position. The leading edge of the latch disc 102 thereafter engages the edge of the hammer 98 so as to rotate the hammer in a clockwise direction about its pivot pin 82. The hammer is thus rotated back to its initial position against the yieldable urging of its drive spring 100 so that its magnet keeper 116 can engage the electromagnet 114 in readiness for a subsequent photographic cycle. As is now readily apparent, rotation of the latch disc 102 back to its initial position operates to retain the hammer 98 in its cocked position adjacent the electromagnet 114 while simultaneously restraining the walking beam 80 from being driven by its drive spring 96 toward the scene light unblocking arrangement. Rotation of the latch disc 112 in the aforementioned manner also serves to move the over center spring 110 back over pivot pin 106 at which instant the spring 110 operates to resiliently bias the latch disc 102 for rotation in a counterclockwise direction toward its initial cocked position. Thus, a photographic cycle in a self-developing camera utilizing scanning type shutter blade elements may be effected without the use of a solenoid by drive spring elements which operate to drive the walking beam 80 in the aforementioned manner. The above described exposure control system is disclosed and claimed in copending application Ser. No. 830,019 supra.

Figure 12:
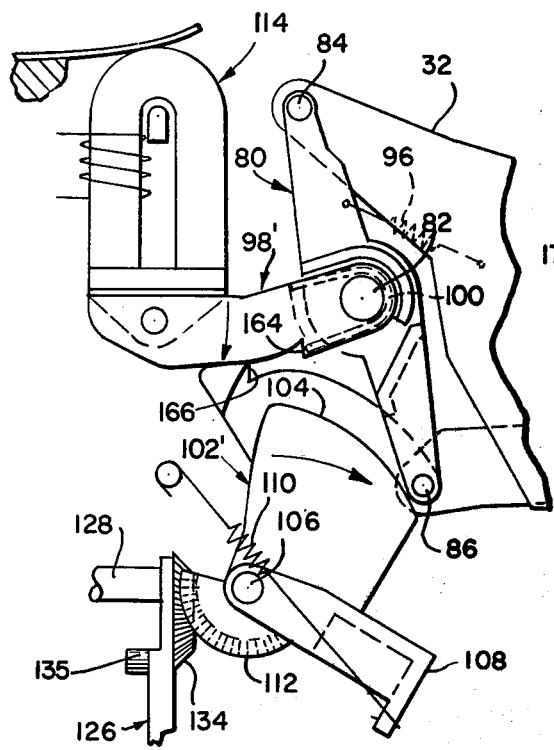
FIG. 12 is a front elevation of a portion of the exposure control system of FIG. 2 showing the flash inhibit feature of this invention.
Figure 14:
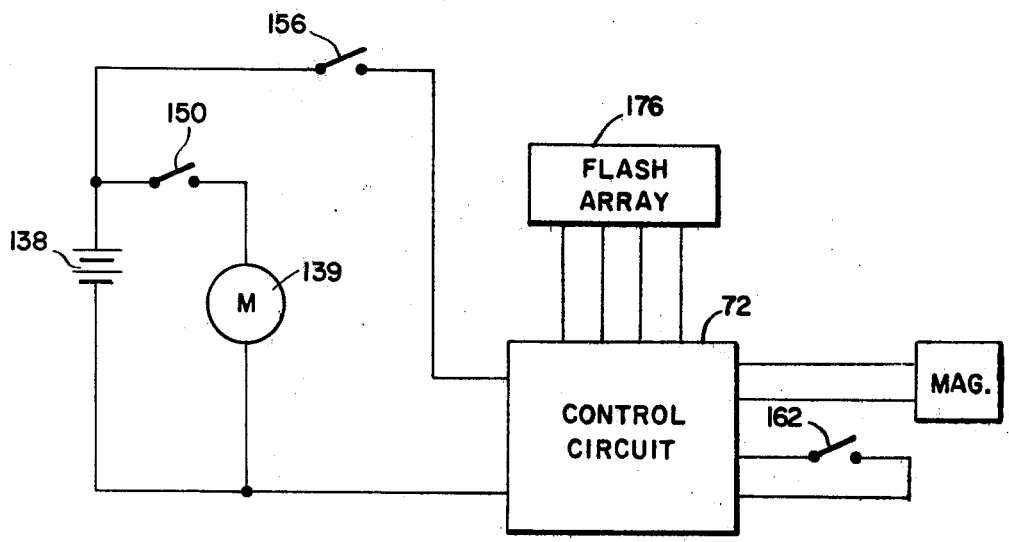
FIG. 14 is a schematic diagram for an exposure control circuit.

Referring now to FIG. 12 there is shown the improved arrangement for the exposure control system of this invention suitable for use in cameras of the type which are adapted to be used with a linear flash array 176 as shown schematically in FIG. 14 and which additionally include a control circuit 72 capable of detecting the expenditure of all the lamps within an operative phase of the flash array 176 as is more fully disclosed in U.S. Pat. No. 4,005,449 entitled "Flash Photographic System With Camera Inhibit Feature" by Seymour Ellin issued Jan. 25, 1977. The hammer 98' includes a notch 164 on the edge thereof which is complementary to a notch 166 formed in the edge of the latching disc 102'. Initiation of an exposure cycle may commence in the aforementioned manner with the depression of the photographic cycle initiating button 36. However, as is readily apparent, by referring to FIGS. 3 and 6, which show the extreme end positions for the actuator 118 and control circuit switch 156 during depression of the button 36, the control circuit switch leafs 158 and 160 are allowed to spring into electrical contact with each other to close the control circuit switch 156 prior to the time at which the latch in disc 102 releases the walking beam 80 and its associated shutter blade elements 32, 34 for movement toward their scene light unblocking arrangement. Immediately upon closure of the control circuit switch 156, there is automatically performed an interrogation of all the flash lamps within an operative face of the flash array 176 in the manner as disclosed in U.S. Pat. No. 4,005,449, supra. Should all the flash lamps in an operative face of the array 176 be expended, there is then provided by the control circuit 72 a signal which is operative to deenergize the magnet 114 permitting the hammer 98' to be rotated in a counterclockwise direction by its drive spring 100 into engagement with the edge of the latching disc 102'. Continued clockwise rotation of the latching disc 102' in correspondence with the continued depression of the button 36 operates to bring the notch 166 into engagement with notch 164 thereby inhibiting further rotation of the latch disc 102' so as to mechanically inhibit an exposure cycle. In this manner, a photographic cycle may be mechanically inhibited as a function of all the flash lamps in an operative face of a flash array 176 being expended. Subsequent release of the button 36 by the user will operate to return the latch disc 102' towards its initial position by virtue of the resilient bias applied by the over center spring 110. The leading edge of the returning latch disc 102' in turn, engages the edge of the hammer 98' so as to rotate the hammer 98' in a clockwise direction about the pivot pin 82 thereby returning the hammer 98' to its initial position with the keeper 116 engaged to the electromagnet 114.

Figure 13:
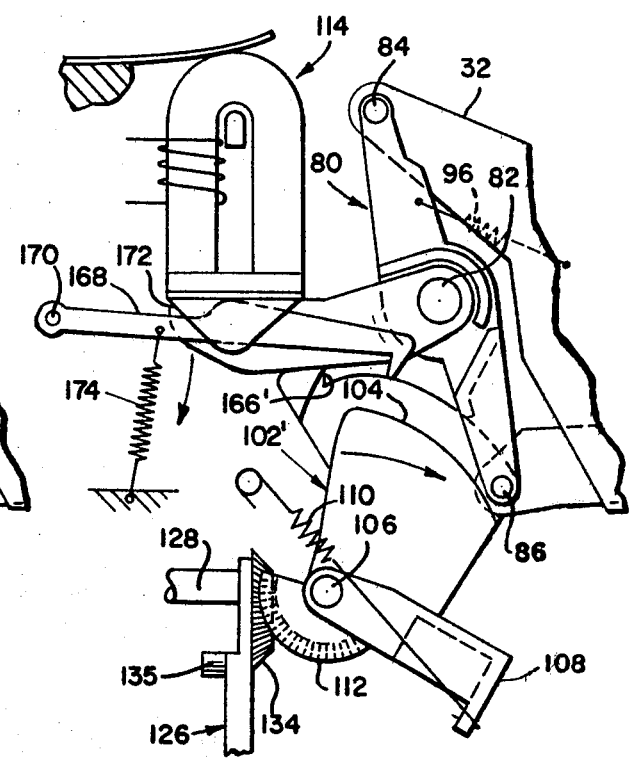
FIG. 13 is a front elevation of a portion of the exposure control system of FIG. 2 showing an alternate embodiment to the flash inhibit feature of FIG. 12.

Referring now to FIG. 13 there may be seen still another arrangement for mechanically inhibiting a photographic cycle as a function of detecting the expenditure of all the flash lamps within an operative face of the flash array 176. This embodiment, in similar manner to the aforementioned embodiment, utilizes a notch 166' in latching disc 102'. A pawl 168 is connected for pivotal movement with respect to the base block casting 14 by a pivot pin 170. The pawl 168 is resiliently biased for rotation in a clockwise direction about a pivot pin 170 by a tension spring 174 which is grounded with respect to the base block casting 14. The pawl 168 may additionally include a magnet keeper 172 which is also adapted to engage the magnet 114 so as to be retained thereby against the bias of spring 174. Detection of the expenditure of all the flash lamps within an operative face of the flash array 176 in the aforementioned manner results in the deenergization of the magnet 114 thereby releasing both the hammer 98 and the pawl 168 for rotation about their respective pivot points. The pawl 168 thus drops against the edge of the latch disc 102' so as to engage the notch 166' thereby inhibiting further rotation of the latching disc 102' to release the walking beam 80 and its associated shutter blade elements 32 and 34 for movement toward their scene light unblocking arrangement. Release of the exposure initiating button 36 in the aforementioned manner again permits the latch disc 102 to be rotated by the over center spring 110 back to its initial recocked position. The edge of the latching disc 102' is also configured to cam the pawl 168 to its initial position such that the pawl magnet keeper 172 engages the electromagnet 114. Thus, an exposure cycle may be mechanically inhibited as a function of the expenditure of all the flash lamps within an operational face of a flash array.

Since certain changes may be made in the above-described embodiment without departing from the scope of the invention herein involved, it is intended that all matter contained in the above description or shown in the accompanying drawings be interpreted as illustrative and not in a limiting sense.

What is claimed is:

1. A photographic camera apparatus having means for mounting photographic film material at a given focal plane, said camera comprising:
   a blade mechanism;
   means for mounting said blade mechanism for displacement between at least one blocking arrangement precluding transmission of scene light to the focal plane and an unblocking arrangement defining at least one aperture value structured for transmission of scene light to the focal plane;
   first selectively actuable drive means for urging displacement of said blade mechanism from said blocking arrangement toward said unblocking arrangement;
   second actuable drive means for urging displacement of said blade mechanism from said unblocking arrangement toward said blocking arrangement;
   first latch means for restraining said blade mechanism and said second drive means, said first latch means including a movable member disposed for displacement between first and second positions and structured and configured for restraining said blade mechanism in said blocking arrangement against the urging of said first drive means while simultaneously restraining said second drive means from urging displacement of said blade mechanism while said first latch means movable member is in said first position, said first latch means being selectively actuable to move said movable member from its said first position to its said second position to effect the release of said blade mechanism and said second drive means, said blade mechanism thereafter moving under the influence of said first drive means from said blocking position toward said unblocking position to commence an exposure cycle;
   second latch means for restraining said second drive means from urging displacement of said blade mechanism upon the release of said second drive means by said movable member said second latch means being thereafter actuable to cause the release of said second drive means and effect the displacement of said blade mechanism from said unblocking arrangement toward said blocking arrangement under the influence of said second drive means thereby completing said exposure cycle;
   means for moving said movable member from said second position back to said first position, said movable member being operative during said movement from said second position toward said first position to maintain said blade mechanism in said blocking arrangement against the urging of said first drive means while simultaneously restraining said second drive means from urging displacement of said blade mechanism;
   means for releasably connecting to at least one conventional flash lamp together with means for providing a first signal to fire the connected flash lamp at the appropriate time during said exposure cycle; and
   means for sensing the operative condition of at least one connected flash lamp at said connecting means and providing a second signal indicative of an inoperative or missing flash lamp, said second signal being effective to actuate said second latch means to release said second drive means, said photographic apparatus additionally including means for ultimately restraining movement of said first latch means movable member from its said first position to its said second position upon the release of said second drive means, while accommodating movement of said first latch means movable from its said second position back to its said first position.

2. The apparatus of claim 1 wherein said first latch means is restrained by said restraining means at an intermediate position between its said first and second positions and there are also included resilient means for yieldably urging said first latch means movable member to move from its said intermediate position back to its said first position without incurring said restraining means restraining influence.

3. A photographic camera apparatus having means for mounting photographic film material at a given focal plane, said camera comprising;
   a blade mechanism;
   means for mounting said blade mechanism for displacement along a predetermined path between a first arrangement wherein it precludes scene light from reaching the film plane and a second arrangement wherein it defines a maximum size aperture, said blade mechanism serving to define a range of progressively increasing sized apertures as it moves from its said first arrangement to said second arrangement;
   first selectively actuable drive means for urging displacement of said blade mechanism from its said first arrangement toward its said second arrangement;
   second actuable drive means for urging displacement of said blade mechanism from its said second arrangement back toward its said first arrangement against the urging of said first drive means;
   first latch means for restraining said blade mechanism and said second drive means, said first latch means including a movable member disposed for displacement between first and second positions and structured and configured for holding said blade mechanism in its said first arrangement against the urging of said first drive means while simultaneously restraining said second drive means from urging displacement of said blade mechanism back toward its said first arrangement while said first latch means movable member is in its said first position, said first latch means being selectively actuable to move said movable member from its said first position to its said second position to effect the release of said blade mechanism and said second drive means, said blade mechanism thereafter moving under the influence of said first drive means from its said first arrangement toward its said second arrangement to commence an exposure cycle;
   second latch means for restraining said second drive means from urging displacement of said blade mechanism upon the release of said second drive means by said first latch means movable member, said second latch means being thereafter actuable to cause the release of said second drive means and effect the displacement of said blade mechanism from its said first arrangement back toward its said second arrangement against the urging of said first drive means thereby completing said exposure cycle;

means for releasably connecting to at least one conventional flash lamp together with means for providing a first signal to fire the connected flash lamp at the appropriate time during said exposure cycle;

means for sensing the operative condition of at least one connected flash lamp at said connecting means and providing a second signal indicative of an inoperative or missing flash lamp, said second signal being effective to actuate said second latch means to release said second drive means; and means for ultimately restraining movement of said first latch means movable member from its said first position to its said second position upon the release of said second drive means while still allowing movement of said first latch means movable member from its said second position back to its said first position.

4. The apparatus of claim 3 wherein said first latch means is restrained by said restraining means at an intermediate position between its said first and second positions and there are also included resilient means for yieldably urging said first latch means to move from its said intermediate position back to its said first positions without incurring said restraining means restraining influence.

5. A photographic camera apparatus of the type having means for mounting photographic film material at a given focal plane, means for releasably connecting to at least one conventional flash lamp and means for providing a signal to fire the connected flash lamp at the appropriate time during an exposure cycle, comprises:

a blade mechanism;

means for mounting said mechanism for displacement between at least one blocking arrangement precluding transmission of scene light to the focal plane and an unblocking arrangement defining at least one aperture value structured for transmission of scene light to the focal plane;

resilient means for yieldably urging said mechanism from its said blocking arrangement toward its said unblocking arrangement;

selectively actuable means movable between first and second positions for retaining said blade mechanism in its said blocking arrangement against the urging of said resilient means while in its said first position and moving from its said first position to its said second position in response to selective actuation thereof so as to release said blade mechanism for movement from its said blocking arrangement to its said unblocking arrangement under the influence of said resilient means; and means, at least in part electrically energizable, for sensing the operative condition of at least one connected flash lamp at the connecting means and responding to an inoperative or missing lamp by restraining said selectively actuable means from moving from its said first position to its said second position regardless of any attempt by the user to actuate said selectively actuable means.

* * * * *